(12) United States Patent
Sasaki

(10) Patent No.: US 6,427,579 B1
(45) Date of Patent: Aug. 6, 2002

(54) PISTON OF INTERNAL COMBUSTION ENGINE AND METHOD OF PRODUCING SAME

(75) Inventor: Masato Sasaki, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/628,687

(22) Filed: Jul. 28, 2000

(30) Foreign Application Priority Data

Jul. 30, 1999 (JP) ............................................. 11-217397

(51) Int. Cl.⁷ ............................... B21K 1/18; F16J 1/04
(52) U.S. Cl. ..................................... 92/213; 29/888.045
(58) Field of Search ........................... 92/222, 173, 213; 29/888.04, 888.043, 888.045

(56) References Cited

U.S. PATENT DOCUMENTS

| | | | | |
|---|---|---|---|---|
| 3,149,409 A | * | 9/1964 | Maruhn | ................. 29/888.045 |
| 4,137,887 A | * | 2/1979 | Dunn | ...................... 123/193 P |
| 4,662,326 A | * | 5/1987 | Kohnert | ................... 123/193 P |
| 4,971,003 A | * | 11/1990 | Suzuki et al. | .................. 92/212 |
| 5,660,156 A | * | 8/1997 | Whitacre et al. | ............. 92/213 |

FOREIGN PATENT DOCUMENTS

| | | |
|---|---|---|
| DE | 80 28 685 | 10/1980 |
| DE | 236276 | 6/1986 |
| DE | 247165 | 7/1987 |
| DE | 39 05684 | 8/1990 |
| DE | 199 02 864 | 6/2000 |
| EP | 171567 | 11/1988 |
| JP | 2-113169 | 4/1990 |
| WO | 82/03814 | 11/1982 |

* cited by examiner

Primary Examiner—Edward K. Look
Assistant Examiner—Thomas F. Lazo
(74) Attorney, Agent, or Firm—Foley & Lardner

(57) ABSTRACT

A piston of an internal combustion engine comprises a crown portion constructed of an aluminum alloy. The crown portion has a bowl in a top surface thereof. The bowl serves as a combustion chamber. Boss portions are projected downward from the crown portion. The boss portions have aligned piston pin holes respectively which have a common axis. A generally annular reinforced zone is provided on the top surface of the crown and extends around a peripheral edge of the bowl. The mechanical strength of the reinforced zone gradually lowers as the distance from the common axis increases.

16 Claims, 6 Drawing Sheets

PISTON OF INTERNAL COMBUSTION ENGINE AND METHOD OF PRODUCING SAME

BACKGROUND OF THE INVENTION

1. Field of the Invention

The present invention relates in general to pistons of an internal combustion engine and method of producing same. More specifically, the present invention is concerned with the pistons of a type having a bowl at a top of the piston crown, and method of producing same.

2. Description of the Prior Art

Usually, pistons of internal combustion engine are made of aluminum alloys because the alloys are light weight and have the required strength. The piston has at a top of the crown thereof a recess or bowl which serves as a combustion chamber, and has at a predetermined portion thereof a piston pin hole through which a piston pin passes for pivotally connecting a connecting rod to the piston. For producing an engine power, the piston is forced to reciprocate in a cylinder formed in a cylinder block.

Under operation of the engine, the top surface of the piston crown receives a marked thermal shock. In fact, it has been revealed that during engine operation a small but certain deformation takes place in the piston crown due to the powerful combustion pressure and inertial force that are inevitably produced when the piston makes the reciprocating motion.

The piston pin functions to transmit the combustion pressure applied to the piston crown to the connecting rod and thus the deformation of the piston crown is greatly dominated by the position of the piston pin. That is, the combustion pressure is applied in an axial direction of the piston and thus a certain bending moment with a center at the piston pin is inevitably produced on the crown top surface. This means that under explosion stroke of the piston, portions of the crown top surface that extend along the axis of the piston pin are applied with a tensile stress and portions of the crown top surface that extend along an axis perpendicular to the piston pin axis are applied with a compressive stress. While, as to the thermal shock inevitably applied to the crown top surface, the portions of the crown top surface that extend along the axis perpendicular to the piston pin axis are applied with a marked thermal stress due to the density distribution of the piston. This means that first portions of a peripheral edge of the bowl (viz., combustion chamber) formed in the crown top surface that are located along the axis of the piston pin are applied with a tensile stress and second portions of the peripheral edge that are located along the axis perpendicular to the piston pin axis are applied with such marked thermal stress. Thus, hitherto, various measures have been proposed and actually employed for providing the first portions with a sufficient mechanical strength and the second portions with an anti-thermal stress structure.

Japanese Patent First Provisional Publication 2-113169 shows a measure for such need. That is, in the measure, the first portions are strengthened or hardened and the second portions are softened.

However, even the measure proposed by the publication has failed to exhibit a satisfied result because of a boundary that is inevitably formed between the hardened and softened portions. As is known, such boundary part tends to be subjected to a stress concentration, that lowers the mechanical strength of the piston.

SUMMARY OF THE INVENTION

It is therefore an object of the present invention to provide a piston of internal combustion engine, which is free of the above-mentioned drawbacks.

It is another object of the present invention to provide a method of the piston.

According to a first aspect of the present invention, there is provided a piston of an internal combustion engine. The piston comprises a crown constructed of an aluminum alloy and having a bowl at a top surface thereof, the bowl serving as a combustion chamber; boss portions projected downward from the crown, the boss portions having aligned piston pin holes respectively, the aligned piston pin holes having a common first axis; and a generally annular reinforced zone provided on the top surface of the crown and extending around a peripheral edge of the bowl, wherein the mechanical strength of the reinforced zone gradually lowers as the distance from the first axis of the piston pin holes increases.

According to a second aspect of the present invention, there is provided a method of producing a piston of an internal combustion engine. The piston is constructed of an aluminum alloy and has piston pin holes at downward projected portions thereof and a bowl at a crown top surface thereof. The method comprises the steps of (a) preparing a blank piston that has no bowl at the crown top surface; (b) placing a fusible ring on the is crown top surface, the fusible ring containing reinforcing materials; (c) fusing the fusible ring and its neighbor of a base material of the blank piston thereby to produce an alloy layer on the crown top surface, the fusing being so made that the amount of the reinforcing materials contained in the alloy layer gradually lowers as the distance from a first axis increases, the first axis being a common axis of the piston pin holes; and (d) machining a bowl at the crown top surface in the area of the alloy layer.

DETAILED DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1A:
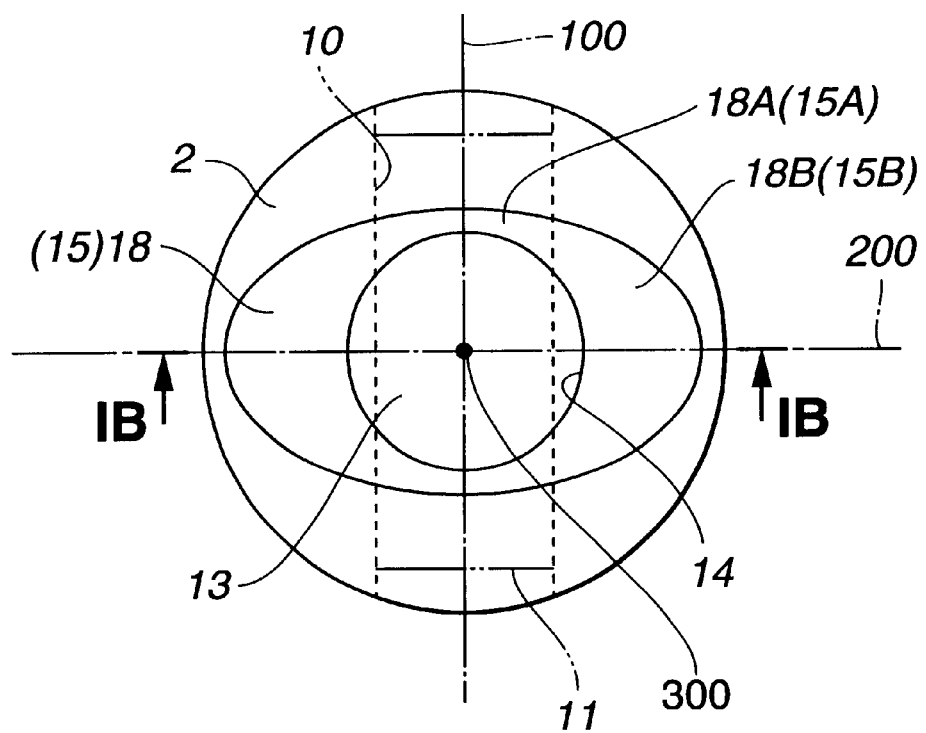
FIG. 1A is a plan view of a piston of a first embodiment of the present invention.
Figure 1B:
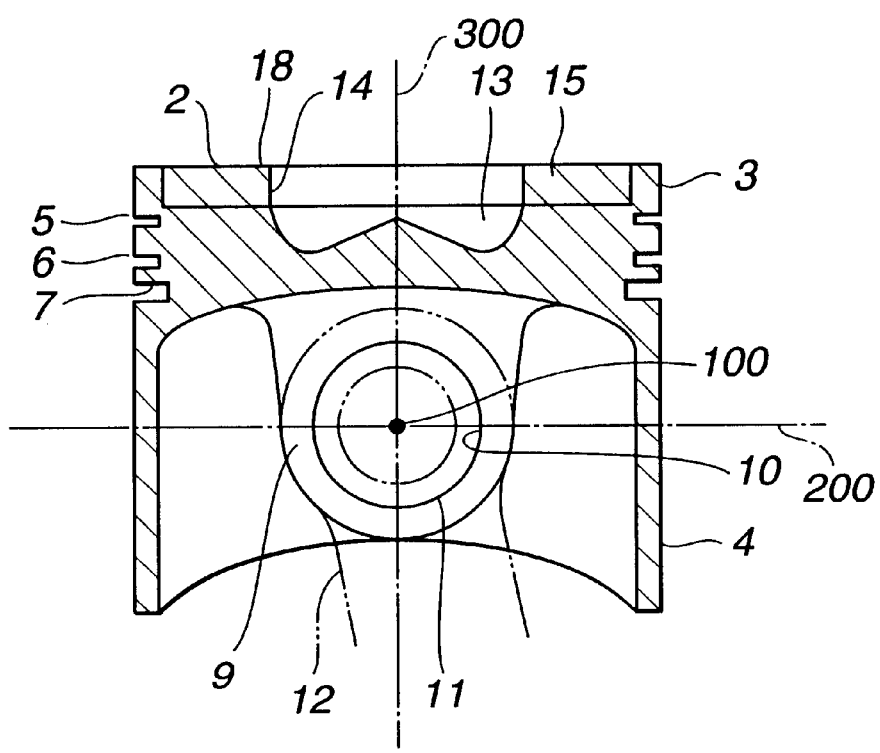
FIG. 1B is a sectional view taken along the line IB—IB of FIG. 1.
Figure 2:
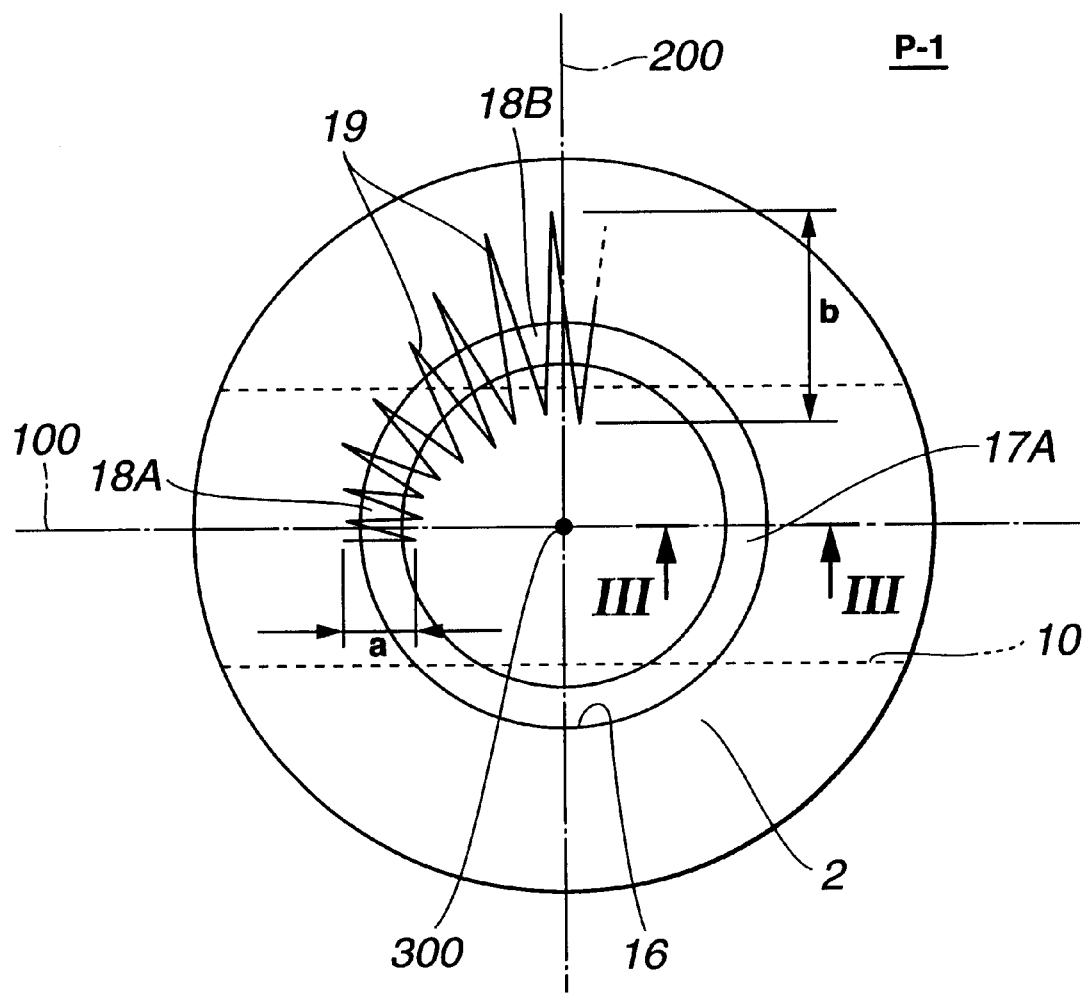
FIG. 2 is a plan view of the piston showing a method of producing the piston of the first embodiment by applying an electron beam on a fusible ring located on a crown top surface.

Referring to FIGS. 1 to 5, particularly FIGS. 1 and 2, there is shown a piston P-1 which is a first embodiment of the present invention. The piston P-1 is constructed of an aluminum alloy, such as one standardized as JIS (Japanese Industrial Standards) AC8A, AC8B or AC8C.

As is best shown in FIGS. 1A and 1B, the piston P-1 comprises a crown portion having a top surface 2, a ring land portion 3 and a skirt portion 4 which are united to constitute a cylindrical hollow unit, as shown.

As is seen from FIG. 1B, the ring land portion 3 has three piston ring grooves 5, 6 and 7 formed therearound. The two piston ring grooves 5 and 6 that are located nearer to the crown top surface 2 are used for receiving compression rings (not shown), and the piston ring groove 7 that is located nearer to the skirt portion 4 is used for receiving an oil ring (not shown).

Within the skirt portion 4, two pin boss portions 9 are projected downward from the crown portion, which are arranged symmetrical with respect to an axis 300 of the piston P-1. The pin boss portions 9 have respective pin holes 10 which are aligned and thus have a common axis 100. For ease of understanding, this axis 100 will be referred to as a first axis 100 in the following.

The first axis 100 of these two pin holes 10 is substantially perpendicular to the axis 300 of the piston P-1, as is seen from FIGS. 1A and 1B.

A hollow piston pin 11 is received in the aligned two pin holes 10 and is pivotally connected with an upper end of a connecting rod 12. That is, the upper end of the connecting rod has a hole through which the piston pin 11 passes to achieve the pivotal connection therebetween.

As is seen from the drawings, the crown top surface 2 is formed with a bowl or recess 13 that constitutes a combustion chamber when associated with a corresponding cylinder (not shown). As is seen from FIG. 1A, the bowl 13 has a circular peripheral edge 14.

As will be described in detail hereinafter, a predetermined oval zone 15 of the crown top surface 2 that surrounds the circular peripheral edge 14 is reinforced by an alloy layer 18, and the oval reinforced zone 15 is so formed that as is seen from FIGS. 1A and 1B, the mechanical strength of the same gradually lowers as the distance from the first axis 100 increases in a direction perpendicular to the first axis 100.

More specifically, the mechanical strength of the zone 15 gradually lowers with increase of the distance from an imaginary axis that is in parallel with the first axis 100 and extends over the bowl 13.

For producing the piston P-1, casting of an aluminum alloy is employed for producing a blank piston (P-1). The production of the piston P-1 is made in the following manner.

First, as is understood from FIG. 2, the blank piston (P-1) is produced through the casting, that has no bowl or recess 13 at the crown top surface 2. Then, an annular groove 16 is machined or cut in the crown top surface 2. It is to be noted that machining of the annular groove 16 may be made before or after formation of the piston ring grooves 5, 6 and 7 and pin holes 10.

Figure 3:
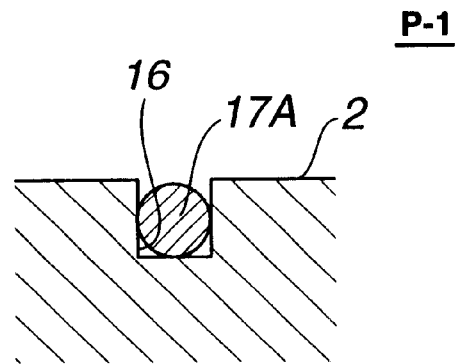
FIG. 3 is an enlarged sectional view taken along the line III—III of FIG. 2.

Then, as is seen from FIG. 3, a fusible ring 17A is intimately put into the annular groove 16. The fusible ring 17A is fused or melted when highly heated and is constructed of metallic materials containing copper and fiber-reinforced aluminum alloys. The reinforcing fibers are for example, silicon carbide whisker, silicon nitride whisker, alumina short fober, alumina-silica short fiber, potassium titanate whisker, aluminum borate whisker and mixture of these fibers.

Then, by applying high heat, the fusible ring 17A and its neighbor of the piston P-1 that extends along the ring 17A are fused or melted. With this, components of the fusible ring 17A are diffused in a given part of the crown top surface 2 thereby to produce the alloy layer 18.

Figure 4:
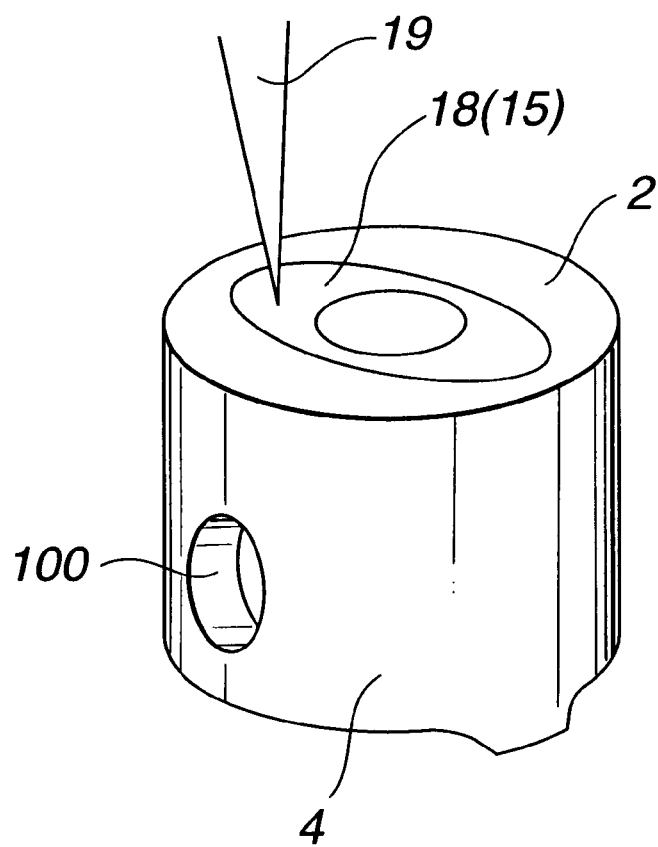
FIG. 4 is a perspective view of the piston showing the method of producing the piston of the first embodiment by applying the electron beam on the fusible ring located on the crown top surface.

As is understood from FIGS. 2 and 4, application of heat is carried out by irradiating an electron beam 19 to the given annular area in a vacuum atmosphere. Irradiation of the electron beam 19 is carried out while slowly rotating the piston P-1 about its axis 300. Since the groove 16 receiving therein the fusible ring 17A is annular in shape, the beam irradiation is effectively and accurately achieved.

During rotation of the piston P-1, the following phenomenon seems to take place at the crown top surface 2 of the piston P-1.

When the electron beam 19 is irradiated, the irradiated part of the fusible ring 17A and its neighbor part of the base material of the piston P-1 are fused or melted to form an alloy layer 18. While, once the part of the fusible ring 17A and its neighbor part of the base material of the piston P-1 are released from the electron beam 19, the alloy layer 18 is instantly cooled due to the heat radiation effect possessed by the base material of the piston P-1. With this, a fine compound including the aluminum alloy of the piston P-1 and the components of the fusible ring 17A is produced. Since the electron beam 19 has a high energy density, the components of the fusible ring 17A are effectively diffused in the melted portion of the piston P-1.

In the present invention, as has been mentioned hereinabove, the alloy layer 18 is so constructed that the mechanical strength of the same gradually-lowers as the distance from the first axis 100 increases in the direction perpendicular to the first axis 100. This is achieved by employing a unique electron beam irradiation method.

That is, the irradiation of the electron beam is carried out by varying the irradiation range, irradiation time and/or energy density. For example, as is seen from FIG. 2, when the irradiation is being applied to a zone 18A of the crown top surface 2 that is near the first axis 100, the irradiation range is controlled small, while when the irradiation is being applied to a zone 18B that is away from the first axis 100, the irradiation range is controlled large. During rotation of the piston P-1, the beam irradiation range is continuously changed while meeting the above-mentioned small/large conditions. It is to be noted that in FIG. 2, the references "a" and "b" indicate the width of the irradiation range.

Thus, in the zone 18A having a smaller irradiation range, the base material of the piston P-1 provides only a small melted zone and thus such melted zone shows a higher concentration of the components of the fusible ring 17A, while in the zone 18B having a larger irradiation range, the base material of the piston P-1 provides a larger melted zone and thus such melted zone shows a lower concentration of the components of the fusible ring 17A. It is to be noted that the concentration of the components of the fusible ring 17A is continuously varied between the smaller and larger melted zones 18A and 18B. This means that the zone 18A of the alloy layer 18 that extends along the first imaginary axis 100 (see FIG. 1A) has a greater amount of components of the fusible ring 17A and thus exhibits a higher mechanical strength, while the zone 18B of the alloy layer 18 that extends along a second axis 200 has a smaller amount of components of the fusible ring 17A and thus has a lower mechanical strength. The second axis 200 extends perpendicular to the first axis 100 and extends through the axis 300 of the piston P-1.

As is easily understood to those skilled in the art, having a high mechanical strength is effective against a tensile stress, while having a relatively low mechanical strength is effective against a thermal stress.

Experiments have revealed that when the zone 18A of the alloy layer contains 5 to 26 wt. %, preferably 16 wt. % copper, and the zone 18B contains smaller than 16 wt. %, preferably 7wt. % copper, a sufficient performance is obtained by the piston P-1.

Now, explanation will be returned to the method of producing the piston P-1. Machining is then applied to the crown top surface 2 to produce a bowl 13 within the oval area of the alloy layer 18. With this, the bowl 13 is provided with-the oval reinforced zone 15 that surrounds the circular peripheral edge 14 of the bowl 13.

Thus, for the reason that has been mentioned hereinabove, the mechanical strength of thin parts 15A of the oval reinforced zone 15 that are located near the fist axis 100 is relatively high, while, the mechanical strength of larger parts 15B of the oval reinforced zone 15 that are located away from the first axis 100 is relatively low, and the mechanical strength of intermediate portions therebetween is gradually changed.

Under operation of the engine, the crown top surface 2 of the piston P-1 receives a marked thermal shock. It has been revealed that the crown top surface 2 is deformed slightly but certainly due to combustion pressure and inertial force that are inevitably produced when the piston P-1 is forced to make the reciprocating motion. Thus, the thin parts 15A of the oval reinforced zone 15 of the crown top surface 2 that are located near the first axis 100 are applied with a certain tensile stress, and the larger parts 15B of the oval reinforced zone 15 of the surface 2 that are located near the second axis 200 are applied with a certain thermal stress.

However, in accordance with the present invention, since the thin parts 15A of the oval reinforced zone 15 have a relatively high mechanical strength as has been mentioned hereinabove, the same can exhibit a sufficient resistance against such tensile stress. Furthermore, since the larger parts 15B of the oval reinforced zone 15 have a relatively low mechanical strength, the same can exhibit a sufficient resistance against such thermal stress. Furthermore, since the mechanical strength of the over reinforced zone 15 is gradually changed therethroughout, there is no boundary in the zone 15, and thus, undesired stress concentration at such boundary is avoided.

Figure 5:
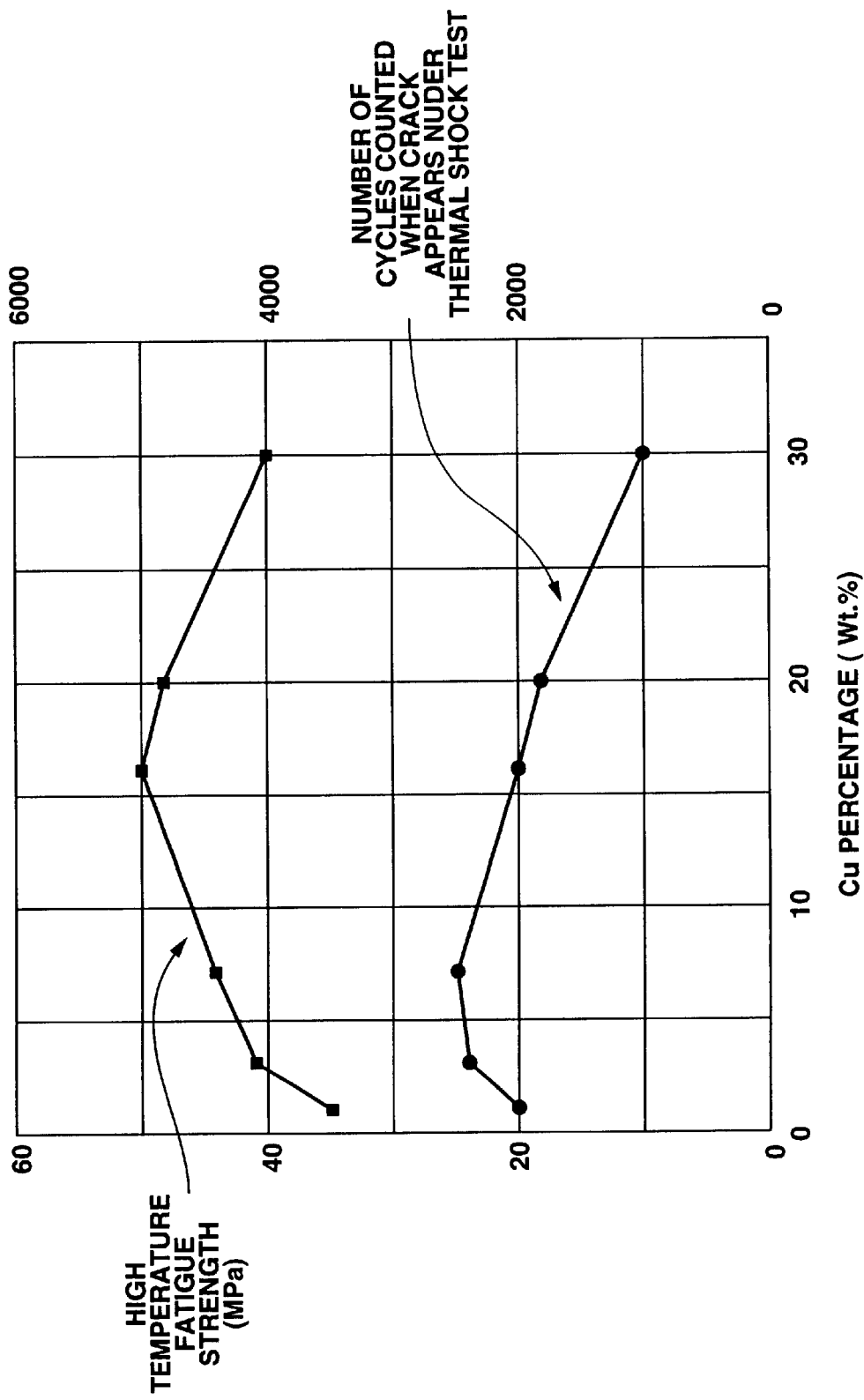
FIG. 5 is a graph of showing results of an endurance test applied to pistons that contained different amounts of copper in the reinforced portions.

In order to find out an ideal concentration of copper in the alloy layer 18, six pairs of test pieces were prepared that contained different percentages (wt. %) of copper therein and they were subjected to a thermal shock test that repeated "360° C. −150° C." thermal shocks until they showed a thermal crack. The results are shown in the graph of FIG. 5. As is seen from this graph, the test piece contained 16 wt. % copper therein showed the highest temperature fatigue strength and it was found that the copper layer 18 contained 5 to 26 wt. % copper therein showed a sufficient mechanical strength. The graph also shows that the test piece contained 7 wt. % copper therein showed the highest cycles (about 2400 cycles) against the thermal shock and it was found that the copper layer 18 contained smaller than 16 wt. % copper therein showed sufficient cycles (above 2000 cycles) against the thermal shock.

Figure 6:
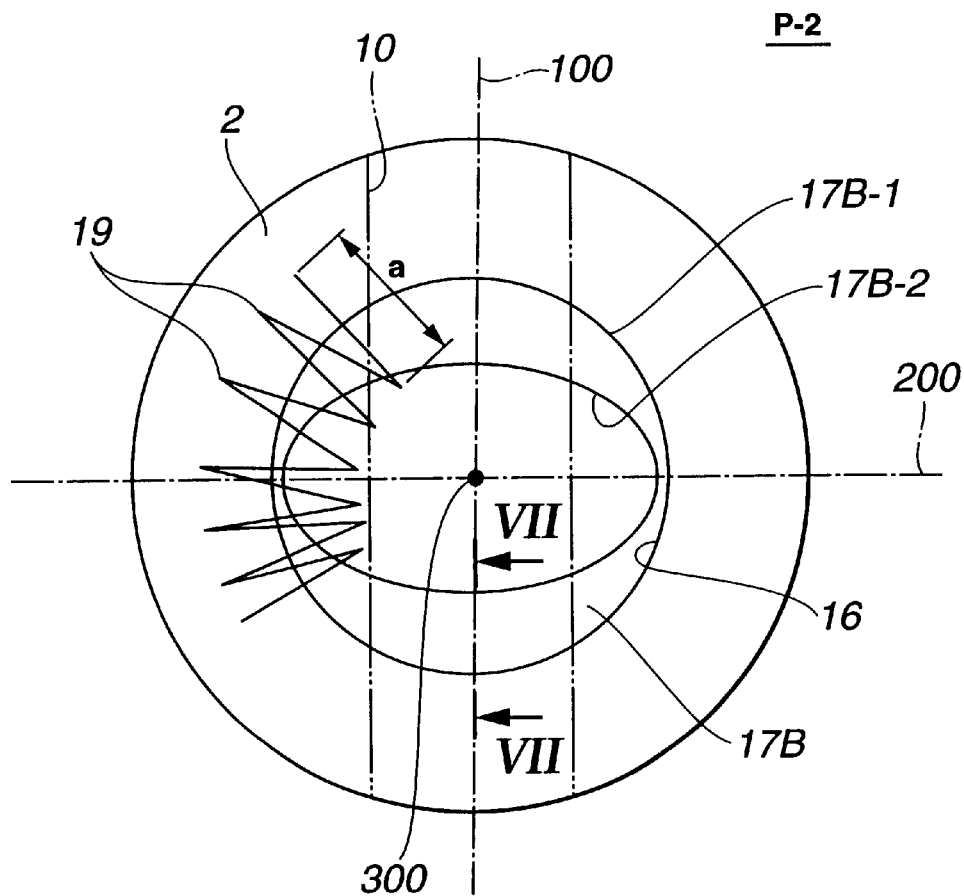
FIG. 6 is a view similar to FIG. 2, but showing a case of a second embodiment of the present invention.
Figure 7:
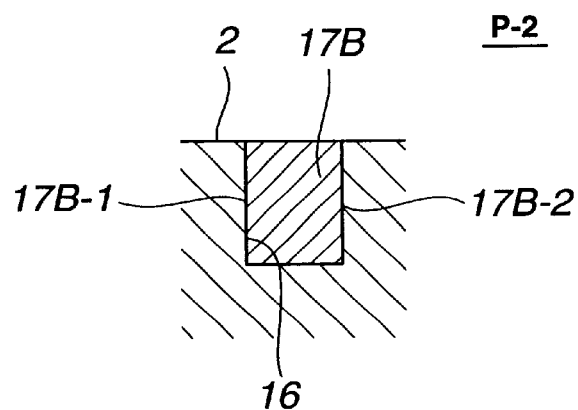
FIG. 7 is an enlarged sectional view taken along the line VII—VII of FIG. 6.

Referring to FIGS. 6 and 7, there is shown a method of producing a piston P-2 of a second embodiment of the present invention. In this method, a partially expanded fusible ring 17B is used in place of the fusible ring 17A employed in the above-mentioned first embodiment P-1. As shown, the fusible ring 17B has a circular outer periphery 17B-1 and an oval inner periphery 17B-2. Thus, as is seen from FIG. 6, the fusible ring 17B comprises two larger or expanded portions which are to be placed on the first imaginary axis 100 and two thin portions which are to be placed on the second imaginary axis 200. If desired, in place of the disclosed fusible member 17B, other fusible rings having different forms may be also used. One of them is a fusible ring that has an oval outer periphery and a circular inner periphery. Another is a fusible ring that has an oval outer periphery and an oval inner periphery.

As is seen from FIG. 7, the fusible ring 17B is put in a corresponding groove 16 formed in the crown top surface 2.

As is seen from FIG. 6, with the piston P-2 being rotated, irradiation of the electron beam 19 to the fusible ring 17B and its surrounding portion of the crown top surface 2 of the piston P-2 is so made as have an even width "a" therethroughout. Thus, the zones of the crown top surface 2 that are near the first axis 100 are fused or melted to contain a greater amount of components of the fusible ring 17B, while the zones of the crown top surface 2 that are near the second axis 200 are fused or melted to contain a smaller amount of components of the fusible ring 17B. This means that the zones that are near the first axis 100 exhibits a higher mechanical strength, while the zones that are near the second axis 200 exhibits a lower mechanical strength, like in the case of the first embodiment P-1.

Then, a bawl for the combustion chamber is machined in the crown top surface 2 within a zone that corresponds to the inner oval periphery of the fusible ring 17B. Thus, in this second embodiment P-2, the peripheral portion of the bowl has substantially the same reinforced structure as the piston P-1 of the first embodiment.

Figure 8:
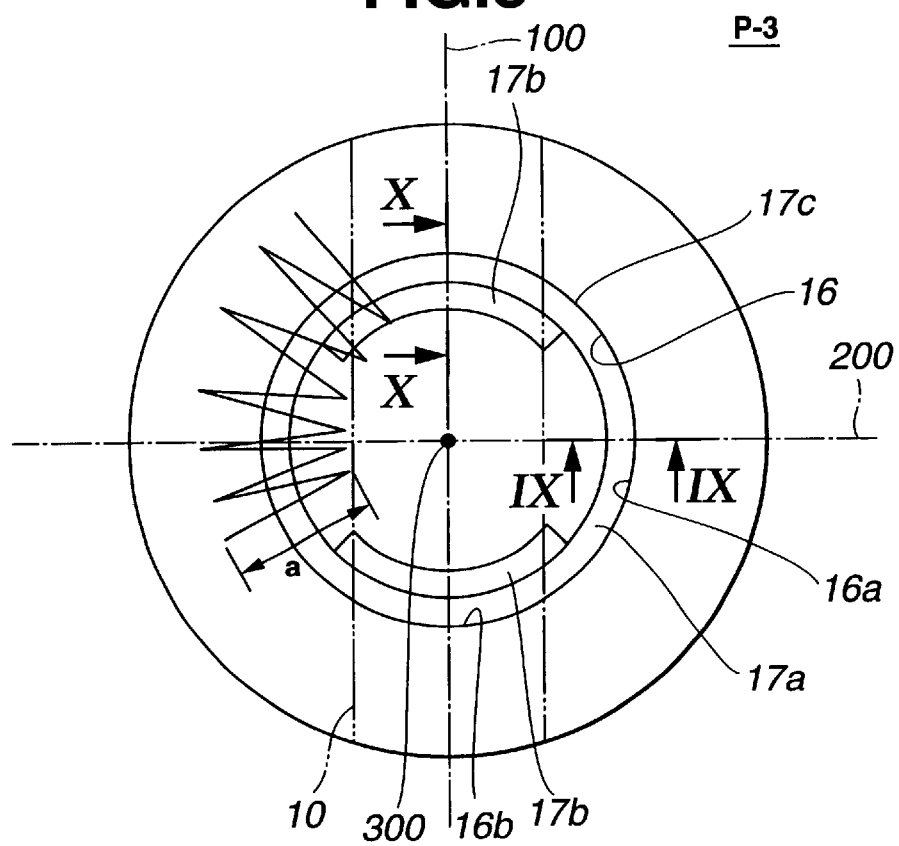
FIG. 8 is a view similar to FIG. 2, but showing a case of a third embodiment of the present invention.
Figure 9:
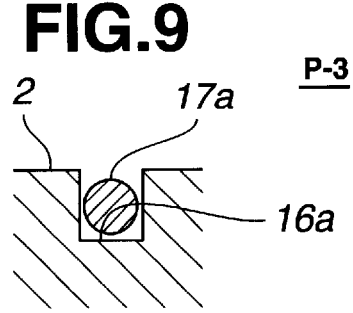
FIG. 9 is an enlarged sectional view taken along the line IX—IX of FIG. 8.
Figure 10:
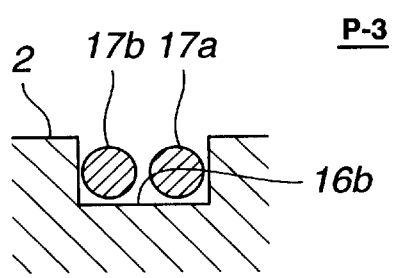
FIG. 10 is an enlarged sectional view taken along the line X—X of FIG. 8.

Referring to FIGS. 8 to 10, there is shown a method of producing a piston P-3 of a third embodiment of the present invention. Also in this method, a fusible ring 17C having a unique structure is used in place of the fusible ring 17A employed in the above-mentioned first embodiment P-1. As shown in FIG. 8, the fusible ring 17C comprises an annular fusible part 17a and two arcuate fusible parts 17b, and the two arcuate fusible parts 17b are arranged at diametrically opposed inner periphery portions of the annular part 17a. Thus, like in case of the above-mentioned second embodiment P-2, the fusible ring 17C comprises two larger portions that are to be placed over the first axis 100 and two thin portions which are to be placed over the second axis 200.

As is seen from FIGS. 8, 9 and 10, the fusible ring 17C is put in a corresponding groove 16 formed in the crown top surface 2.

As is understood from FIGS. 9 and 10, the groove 16 comprises two thin parts 16a which receive therein the two thin portions of the fusible ring 17C and two larger parts 16b which receive therein the two larger portions of the fusible ring 17C.

As is seen from FIG. 8, with the piston P-3 being rotated, irradiation of the electron beam 19 to the fusible ring 17C and its surrounding portion of the crown top surface 2 of the piston P-3 is so made as to have an even width "a" therethroughout. Thus, like in the case of the above-mentioned second embodiment P-2, the zones of the crown top surface that are near the first axis 100 are fused or melted to contain a greater amount of components of the fusible ring 17C and the zones of the crown top surface 2 that are near the second axis 200 are fused or melted to contain a smaller amount of components of the fusible ring 17C. This means that the zones that are near the first axis 100 exhibits a higher mechanical strength, while the zones that are near the second axis 200 exhibits a lower mechanical strength.

Then, a bawl for the combustion chamber is machined in the crown top surface 2 within a zone that corresponding to an inner periphery of the fusible ring 17C. Thus, also in this third embodiment P-3, the peripheral portion of the bowl has substantially the same reinforced structure as the piston P-1 of the first embodiment.

Although in the above-mentioned three embodiments, the fusible ring 17A, 17B or 17C is put in a corresponding groove 16 formed in the crown top surface 2 before being subjected to the electron beam irradiation, the groove 16 may be removed. That is, in this case, the fusible ring is directly put on the crown top surface 2.

In place of copper contained in the fusible ring 17A, 17B or 17C, alloys of copper may be used, which are for example alloys of copper that include aluminum, silicone, manganese, titanium, boron, nickel or beryllium.

In place of the above-mentioned electron beam, laser beam, plasma beam or TIG (tungsten inert gas) arc may be used for melting the fusible ring 17A, 17B or 17C and its neighbor of the piston P-1, P-2 or P-3.

The entire contents of Japanese Patent Application 11-217397 (filed Jul. 30, 1999) are incorporated herein by reference.

Although the invention has been described above with reference to the embodiments of the invention, the invention is not limited to such embodiments as described above. Various modifications and variations of such embodiments may be carried out by those skilled in the art, in light of the above descriptions.

What is claimed is:

1. A piston of an internal combustion engine, comprising:
   a crown constructed of an aluminum alloy and having a bowl at a top surface thereof, said bowl serving as a combustion chamber;
   boss portions projected downward from said crown, said boss portions having aligned piston pin holes respectively, said aligned piston pin holes having a common first axis; and
   a generally annular reinforced zone provided on the top surface of said crown and extending around a peripheral edge of said bowl,
      wherein the mechanical strength of said reinforced zone gradually lowers as the distance from said first axis of said piston pin holes increases and
      wherein said generally annular reinforced zone is provided by fusing a fusible ring put on the crown top surface and a part of a base material of the piston, said fusible ring containing reinforcing materials.

2. A piston as claimed in claim 1, in which the amount of reinforcing materials contained in the annular reinforced zone gradually lowers as the distance from said first axis increases.

3. A piston as claimed in claim 2, in which the fusing of said fusible ring and said part of the base material of the piston is carried out by using a heat source having a high energy density.

4. A piston as claimed in claim 3, in which said fusing is carried out by irradiating an electron beam onto a given area of the top surface of said crown, and in which the amount of reinforcing materials in the annular reinforced zone is controlled by varying at least one of irradiation range, irradiation time and energy density.

5. A piston as claimed in claim 1, in which said fusible ring contains copper.

6. A piston as claimed in claim 5, in which two portions of the reinforced zone that are positioned along said first axis contains 5 to 26 wt. % copper and other two portions of the reinforced zone that are positioned along a second axis contains smaller than 16 wt. % copper, said second axis extending perpendicular to said first axis and extending through an axis of the piston.

7. A method of producing a piston of an internal combustion engine, said piston being constructed of an aluminum alloy and having piston pin holes at downward projected portions thereof and a bowl at a crown top surface thereof, said method comprising the steps of:
   (a) preparing a blank piston that has no bowl at the crown top surface;

(b) placing a fusible ring on the crown top surface, said fusible ring containing reinforcing materials;

(c) fusing said fusible ring and its neighbor of a base material of said blank piston thereby to produce an alloy layer on the crown top surface, the fusing being so made that the amount of the reinforcing materials contained in said alloy layer gradually lowers as the distance from a first axis increases, said first axis being a common axis of said piston pin holes; and (d) machining a bowl at the crown top surface in the area of said alloy layer.

8. A method as claimed in claim 7, further comprising, between the steps (b) and (c), (e) rotating said blank piston about its axis.

9. A method as claimed in claim 8, in which the step (c) is carried out by using a heat source having a high energy density.

10. A method as claimed in claim 9, in which the step (c) is carried out by irradiating an electron beam onto a given area of the top surface of said crown, and in which the amount of reinforcing materials in the alloy layer is controlled by varying at least one of irradiation range, irradiation time and energy density.

11. A method as claimed in claim 7, in which said fusible ring contains copper as one of the reinforcing materials.

12. A method as claimed in claim 7, in which the step (c) is so made that two portions of the alloy layer that are positioned along said first axis contains 5 to 26 wt. % copper and other two portions of the alloy layer that are positioned along a second axis contains smaller than 16 wt. % copper, said second axis extending perpendicular to said first axis and extending through an axis of the blank piston.

13. A internal combustion engine piston, comprising:

an aluminum alloy crown having a bowl in a top surface thereof;

boss portions projected downward from said crown, said boss portions having aligned piston pin holes respectively, said aligned piston pin holes having a common first axis; and a structural strength modifying material which has been diffused into the aluminum alloy via localized fusing of both the material and the aluminum alloy to produce a generally annular reinforced zone on the top surface of said crown which extends around a peripheral edge of said bowl and which has a structural strength that gradually lowers as the distance from said first axis of said piston pin holes increases.

14. An internal combustion engine piston as claimed in claim 13, wherein the reinforced zone contains a first portion and second portion, and wherein the first and second portions have controlled different amounts of copper.

15. An internal combustion engine piston as claimed in claim 14, wherein the first portion is positioned above said first axis and the second portion is positioned above a second axis which extends perpendicular to said first axis.

16. An internal combustion engine piston as claimed in claim 15, wherein the first portion contains 5–26 wt % of Cu and the second portion contains less than 16 wt % of Cu.

* * * * *